US008188922B2

(12) United States Patent
Kuroshita et al.

(10) Patent No.: US 8,188,922 B2
(45) Date of Patent: May 29, 2012

(54) POSITION INFORMATION ACQUISITION DEVICE, COMPUTER READABLE STORAGE MEDIUM STORING POSITION INFORMATION ACQUISITION PROGRAM AND POSITION INFORMATION ACQUISITION SYSTEM

(75) Inventors: Kazumasa Kuroshita, Kawasaki (JP); Tatsuzo Osawa, Kawasaki (JP); Ryuzo Akagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/016,753

(22) Filed: Jan. 28, 2011

(65) Prior Publication Data
US 2011/0187597 A1     Aug. 4, 2011

(30) Foreign Application Priority Data
Jan. 29, 2010   (JP) .................... 2010-19752

(51) Int. Cl.
*G01S 3/02*     (2006.01)
(52) U.S. Cl. ...................................... 342/463
(58) Field of Classification Search ........... 342/463
See application file for complete search history.

(56) References Cited

U.S. PATENT DOCUMENTS
7,769,848 B2 *   8/2010   Choy et al. .............. 709/224
2009/0117848 A1 *  5/2009   Nagata et al. ............ 455/41.2

FOREIGN PATENT DOCUMENTS
JP     2004-179905 A      6/2004
JP     2008-085785     *  4/2008
JP     2008-85785 A       4/2008

* cited by examiner

*Primary Examiner* — Thomas Tarcza
*Assistant Examiner* — Frank J. McGue
(74) *Attorney, Agent, or Firm* — Fujitsu Patent Center

(57) ABSTRACT

A position information acquisition device includes, a first communication unit to communicate with at least another position information acquisition device; a detection unit to detect whether a number of other position information acquisition devices that are not communicable with the first communication unit reaches a threshold or higher based on history information that records position information of the other position information acquisition devices that were previously communicable with the first communication unit and information of the other position information acquisition devices that are currently communicable with the first communication unit; a position measuring unit to measure a position of the position information acquisition device when the detection unit performs a detection; and a second communication unit to transmit position information measured by the position information measuring unit to a server that manages position information of the position information acquisition device and the other position information acquisition devices.

16 Claims, 17 Drawing Sheets

FIG. 8

| NODE NAME | POSITION ACQUISITION TIME | GPS (LATITUDE) | GPS (LONGITUDE) | IP ADDRESS | GW IP ADDRESS | WIRELESS LAN-AP | TRANSMISSION DESTINATION |
|---|---|---|---|---|---|---|---|
| NODE A | YYYYMMDDhhmmss | +35.42011 | +139.34119 | | | | POSITION INFORMATION DB SERVER |
| NODE A | YYYYMMDDhhmmss | | | xx.xx.xx.xx | yy.yy.yy.yy | zz.zz.zz.zz.zz.zz | NODE B |
| NODE A | YYYYMMDDhhmmss | | | xx.xx.xx.xx | yy.yy.yy.yy | zz.zz.zz.zz.zz.zz | NODE C |
| ... | ... | ... | ... | ... | ... | ... | ... |

FIG. 9

| NODE NAME | POSITION ACQUISITION TIME | GPS (LATITUDE) | GPS (LONGITUDE) | IP ADDRESS | GW IP ADDRESS | WIRELESS LAN-AP | TRANSMISSION DESTINATION |
|---|---|---|---|---|---|---|---|
| NODE A | YYYYMMDDhhmmss | +35.42011 | +139.34119 | xx.xx.xx.xx | yy.yy.yy.yy | zzzzzzzzzzzzzz | POSITION INFORMATION DB SERVER |
| NODE B | YYYYMMDDhhmmss | +35.42011 | +139.34119 | xx.xx.xx.xx | yy.yy.yy.yy | zzzzzzzzzzzzzz | NODE A |
| NODE C | YYYYMMDDhhmmss | +35.42011 | +139.34119 | xx.xx.xx.xx | yy.yy.yy.yy | zzzzzzzzzzzzzz | NODE A |
| ... | ... | ... | ... | ... | ... | ... | ... |

FIG. 10

| NODE NAME | UPDATE DATE AND TIME | GPS (LATITUDE) | GPS (LONGITUDE) | IP ADDRESS | GW IP ADDRESS | WIRELESS LAN-AP |
|---|---|---|---|---|---|---|
| NODE A | YYYYMMDDhhmmss | | | ○ | | |
| NODE B | YYYYMMDDhhmmss | | | ○ | ○ | |
| NODE C | YYYYMMDDhhmmss | | | ○ | ○ | ○ |
| ... | ... | ... | ... | ... | ... | ... |

FIG. 11

| NODE NAME | POSITION ACQUISITION TIME | GPS (LATITUDE) | GPS (LONGITUDE) | IP ADDRESS | GW IP ADDRESS | WIRELESS LAN-AP |
|---|---|---|---|---|---|---|
| NODE B | YYYYMMDDhhmmss | | | | | |
| NODE C | YYYYMMDDhhmmss | | | xx.xx.xx.xx | yy.yy.yy.yy | zz:zz:zz:zz:zz:zz |
| NODE D | YYYYMMDDhhmmss | | | xx.xx.xx.xx | yy.yy.yy.yy | zz:zz:zz:zz:zz:zz |
| ... | ... | ... | ... | ... | ... | ... |

FIG. 12

| NODE NAME | UPDATE DATE AND TIME | GPS (LATITUDE) | GPS (LONGITUDE) | IP ADDRESS | GW IP ADDRESS | WIRELESS LAN-AP | THE NUMBER OF NO-RESPONSE NODES | THE NUMBER OF NO-RESPONSES |
|---|---|---|---|---|---|---|---|---|
| NODE A | YYYYMMDDhhmmss | | | ○ | | | 3 | 1 |
| NODE B | YYYYMMDDhhmmss | | | ◎ | ◎ | | 3 | 1 |
| NODE C | YYYYMMDDhhmmss | | | ○ | ○ | ○ | 4 | 1 |
| ⋮ | ⋮ | ⋮ | ⋮ | ⋮ | ⋮ | ⋮ | ⋮ | ⋮ |

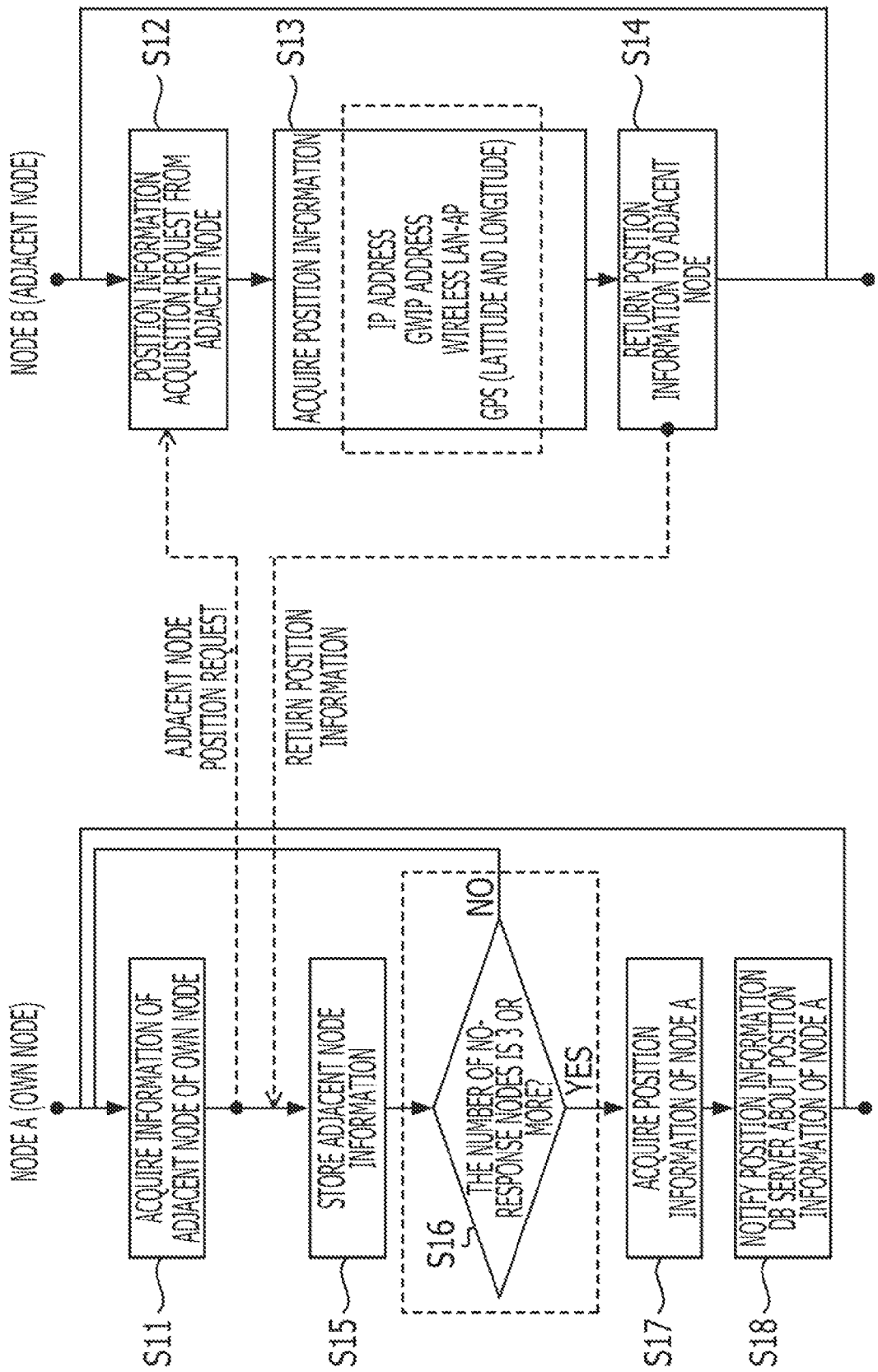

POSITION INFORMATION ACQUISITION DEVICE, COMPUTER READABLE STORAGE MEDIUM STORING POSITION INFORMATION ACQUISITION PROGRAM AND POSITION INFORMATION ACQUISITION SYSTEM

CROSS-REFERENCE TO RELATED APPLICATION

This application is based upon and claims the benefit of priority of the prior Japanese Patent Application No. 2010-19752, filed on Jan. 29, 2010, the entire contents of which are incorporated herein by reference.

FIELD

The embodiments discussed herein relate to a position information acquisition device, a position information acquisition program and a position information acquisition system.

BACKGROUND

Technologies to acquire position information of devices etc. are conventionally known. As one example of technologies to acquire position information of devices etc., Japanese Laid-open Patent Publication No. 2004-179905 discusses a technology in which position information acquired by a devices etc. is transmitted to an external device and the external device manages the movement path of the device.

As another example of technologies to acquire position information of devices etc., Japanese Laid-open Patent Publication No. 2008-85785 discusses a technology that groups devices etc. that are assumed to be carried together and issues an alarm when any of the devices does not exist in a certain distance, and notifying the user that the device is being left behind.

Losing a position of a device may hinder work when maintaining, inspecting, and moving many devices, thus managing position information of devices etc. collectively by an external device etc. has been performed.

SUMMARY

In accordance with an aspect of the embodiments, a position information acquisition device includes, a first communication unit to communicate with at least another position information acquisition device; a detection unit to detect whether a number of other position information acquisition devices that are not communicable with the first communication unit reaches a threshold or higher based on history information that records position information of the other position information acquisition devices that were previously communicable with the first communication unit and information of the other position information acquisition devices that are currently communicable with the first communication unit; a position measuring unit to measure a position of the position information acquisition device when the detection unit performs a detection; and a second communication unit to transmit position information measured by the position information measuring unit to a server that manages position information of the position information acquisition device and the other position information acquisition devices.

The object and advantages of the invention will be realized and attained by at least the features, elements and combinations particularly pointed out in the claims. It is to be understood that both the foregoing general description and the following detailed description are exemplary and explanatory and are not restrictive of the various embodiments, as claimed.

The above-described embodiments of the present invention are intended as examples, and all embodiments of the present invention are not limited to including the features described above.

BRIEF DESCRIPTION OF DRAWINGS

These and/or other aspects and advantages will become apparent and more readily appreciated from the following description of the embodiments, taken in conjunction with the accompanying drawings of which:

FIG. 8 illustrates a data structure of an example of an own node position information history DB;

FIG. 9 illustrates a data structure of an example of a node position information history DB;

FIG. 10 illustrates a data structure of an example of an adjacent node acquisition method of each node DB;

FIG. 11 illustrates a data structure of an example of an adjacent nodes position information history DB;

FIG. 12 illustrates a data structure of an example of an own node movement determination method of each node DB;

FIG. 13 is a flowchart illustrating a first method in which an own node movement determination function unit determines a movement of the own node;

DESCRIPTION OF EMBODIMENTS

The problems were discovered by inventor, as one example of methods to acquire accurate position information of a device, for example, a global positioning system (GPS) is often used. However, measuring position information by some GPSs are costly. For example, some devices seldom move. For devices that seldom move, reducing cost may be considered by measuring a position with a certain interval by a GPS to determine whether the device has been moved. However, the measurement with the certain interval incurs costs for communication and power every time measurement is performed with the certain interval.

Moreover, as one example of transmission methods to transmit position information acquired by a device to an external device, a mobile phone network is often used because of the wide communication area. However, using the mobile phone network has drawbacks in that communication cost is caused and power consumption is large.

In the embodiment, an example in which a position information acquisition device is installed on a machine tool will be described. However, the position information acquisition device may be installed on devices and apparatuses other than machine tools.

Figure 1:
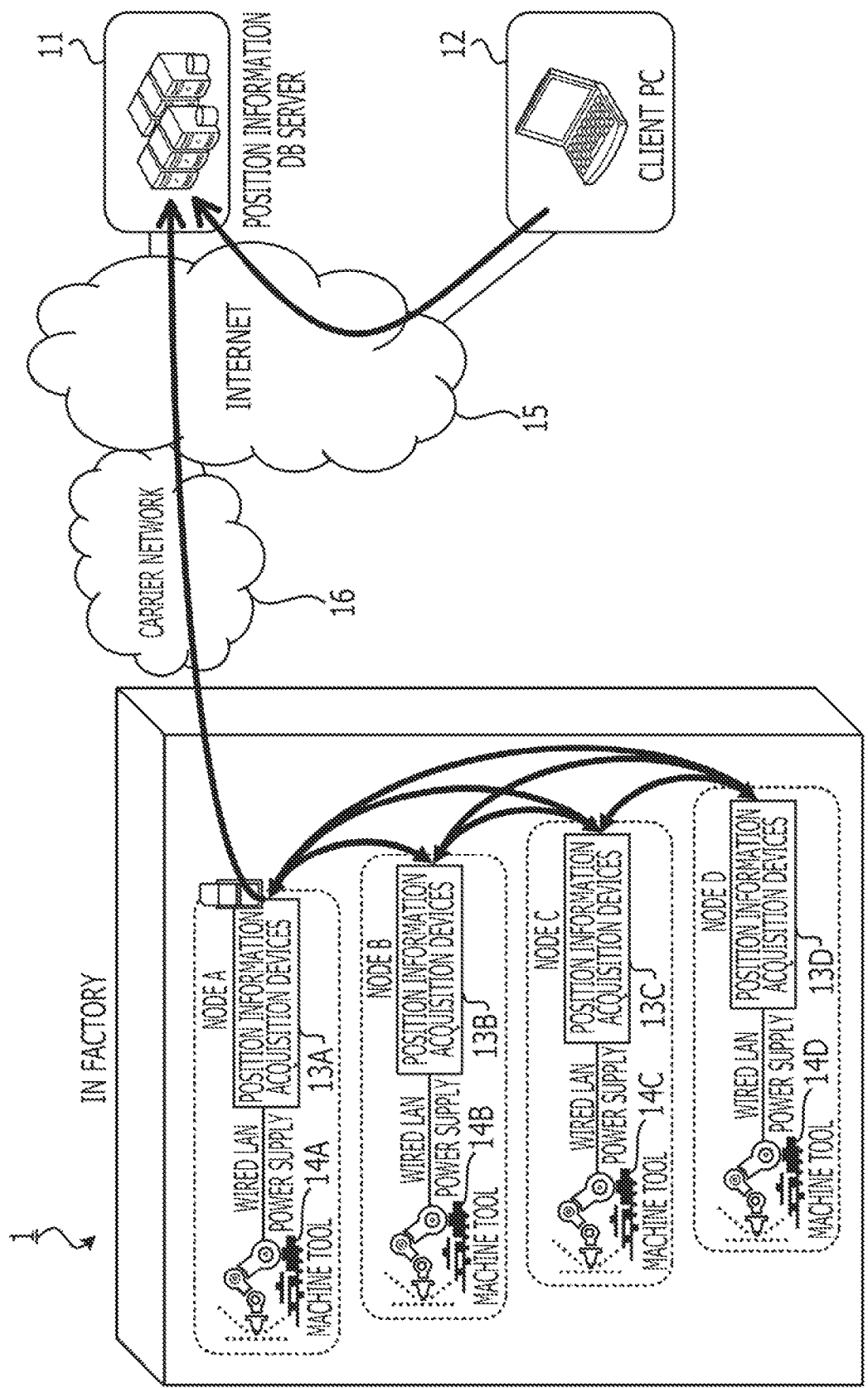
FIG. 1 is a configuration of an example of a position information acquisition system according to an embodiment.

FIG. 1 is a configuration of an example of a position information acquisition system according to an embodiment. A position information acquisition system 1 includes a position information DB server 11, a client PC12, position information acquisition devices 13A to 13D, and machine tools 14A to 14D. Hereinafter, if a position information acquisition device may be any of the position information acquisition devices 13A to 13D, the device is simply called a position information acquisition device 13. If a machine tool may be any of the machine tools 14A to 14D, the machine tool is simply called a machine tool 14.

The position information DB server 11 manages position information of a plurality of position information acquisition devices that includes the position information acquisition devices 13A to 13D. The client PC12 is communicably connected to a position information DB server 11 through a network 15 such as the Internet. The client PC12 may refer to position information managed by the position information DB server 11.

The machine tools 14A to 14D are installed in a factory illustrated in FIG. 1. The machine tool 14A is equipped with the position information acquisition device 13A, and connected with the position information acquisition device 13A through a wired LAN, and supplies power to the position information acquisition device 13A. The machine tools 14B to 14D are also equipped with the position information acquisition device 13B to 13D and connected to the position information acquisition devices 13B to 13D with a wired LAN and supply power to the position information acquisition devices 13B to 13D. The position information acquisition devices 13A to 13D include batteries and may be operated without power supplied from the machine tools 14A to 14D. The position information acquisition devices 13A to 13D may be operated with batteries when the devices are stored in a warehouse as stocks prior to be installed in the factory.

The position information acquisition devices 13A to 13D perform short distance communication, for example, through a wired LAN, a wireless LAN, and a Bluetooth (registered trademark) with an adjacent position information acquisition device 13. The position information acquisition devices 13A to 13D acquire a position of the own device respectively, which will be described later. Position information acquired by the position information acquisition devices 13A to 13D includes at least one of latitude and longitude information measured by a GPS, a mobile phone station or an access point of a wireless LAN used for communication, an IP address of a gateway device used for communication, and an IP address of the own device.

The position information acquisition device 13A illustrated in FIG. 1 may acquire position information of the position information acquisition devices 13B to 13D by performing short distance communication with the position information acquisition devices 13B to 13D. The position information acquisition device 13A determines whether the own device is moved or not based on the number of the position information acquisition devices 13B to 13D to which short distance communication is possible or the number of the position information acquisition devices 13B to 13D the position information of which is changed.

The position information acquisition device 13A acquires position information when the position information acquisition device 13A determines the own device is moved. The position information acquisition device 13A may measure more accurate position information, for example, by using a GPS, which is costly. The position information acquisition device 13A transmits the acquired position information to the position information DB server 11 through a carrier (mobile phone) network 16 and the network 15.

Figure 2:
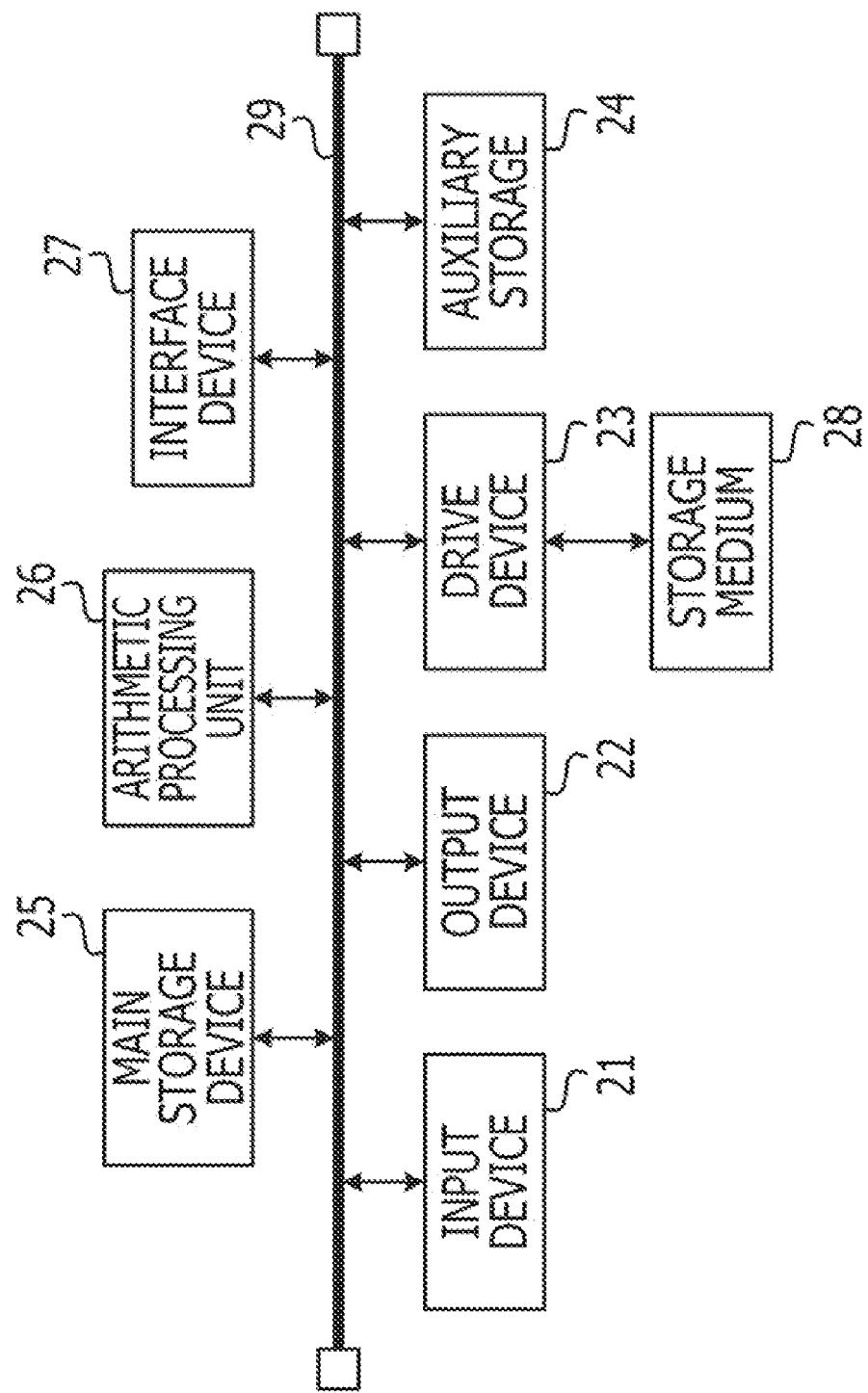
FIG. 2 is a hardware configuration of an example of a position information DB server.

FIG. 2 is a hardware configuration of an example of a position information DB server. The position information DB server 11 includes an input device 21, an output device 22, a drive device 23, an auxiliary storage device 24, a main storage device 25, an arithmetic processing unit 26 and an interface device 27 that are interconnected through a bus 29.

The input device 21 is, for example, a keyboard and a mouse. The input device 21 is used for inputting various signals. The output device 22 is, for example, a display device. The output device 22 is used for displaying various windows and data etc. The interface device 27 is, for example, a modem or a LAN card. The interface device 27 is used to connect to the network 15.

A program that controls the position information DB server 11 is provided through distribution of a storage medium 28 or a download from the network 15. The program is installed in the auxiliary storage device 24. The auxiliary storage device 24 stores desired files and data etc. other than the installed program.

The main storage device 25 reads the program from the auxiliary storage device 24 when the position information DB server 11 is started. The arithmetic processing device 26 achieves various types of unit processing and functions, which will be described later, according to the program stored in the main storage device 25.

Figure 3:
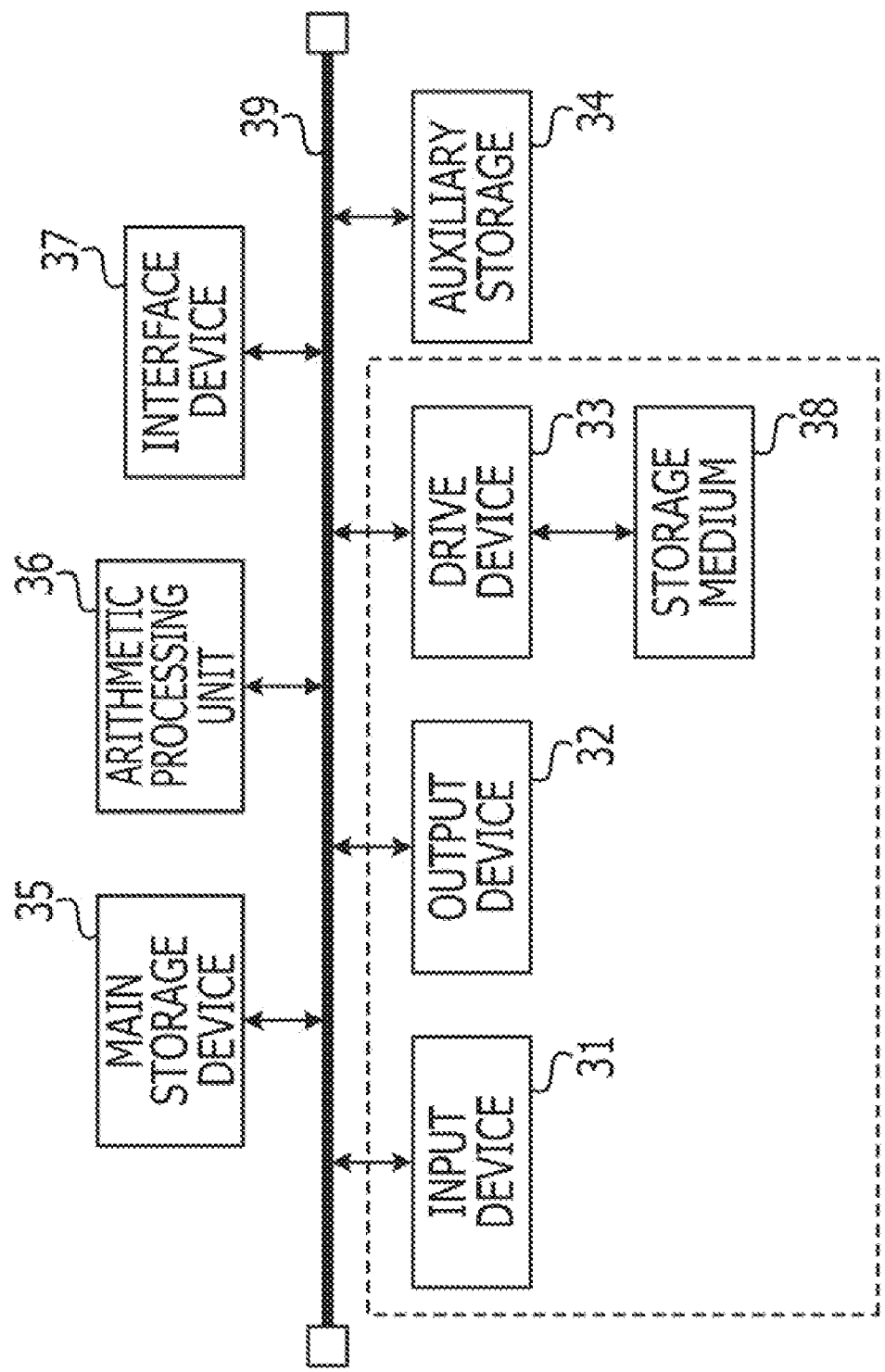
FIG. 3 is a hardware configuration of an example of a position information acquisition device.

FIG. 3 is a hardware configuration of an example of a position information acquisition device. The position information acquisition device 13 includes an input device 31, an output device 32, a drive device 33, an auxiliary storage device 34, a main storage device 35, an arithmetic processing unit 36 and an interface device 37 that are interconnected through a bus 39.

The input device 31 is, for example, a keyboard and a mouse. The input device 31 is used for inputting various signals. The output device 32 is, for example, a display device. The output device 32 is used for displaying various windows and data etc. The interface device 37 includes interfaces for a short distance communication and for a carrier network, and a GPS receiver.

The interface for short distance communication is, for example, a wired LAN, a wireless LAN, and Bluetooth (registered trade mark). The interface for the carrier network is, for example, a communication card that supports the carrier (mobile phone) network 16. The GPS receiver receives a radio wave from a GPS satellite and measures a position. The interface for the carrier network and the GPS receiver are implemented, for example, by a communication card with a GPS function.

The position information acquisition program according to the embodiment is at least a part of various programs that control the position information acquisition device 13. The position information acquisition program is provided through distribution of a storage medium 38 and a download from the network. As the storage medium 38 that stores the position information acquisition program, various types of storage media may be used such as a storage medium that stores information optically or magnetically such as a Compact Disc-Read Only Memory (CD-ROM), a flexible disk, and a magneto-optical disk, or a semiconductor memory that stores information electronically such as a Read Only Memory (ROM) and a flash memory.

The position information acquisition program is installed in the auxiliary storage device 34 from the storage medium 38 through the drive device 33. The position information acquisition program downloaded from the network is installed in the auxiliary storage device 34 through the interface device 37. The auxiliary storage device 34 stores desired files and data etc. other than the position information acquisition program.

The main storage device 35 reads the position information acquisition program from the auxiliary storage device 34 when the position information acquisition device 13 is started. The arithmetic processing device 36 achieves various types of unit processing and functions, which will be described later, according to the position information acquisition program stored in the main storage device 35. In order to save power consumption and reduce the size, the input device 31, the output device 32, the drive device 33, and the storage medium 38 may be omitted when the position information acquisition device 13 is installed on the machine tool 14.

Figure 4:
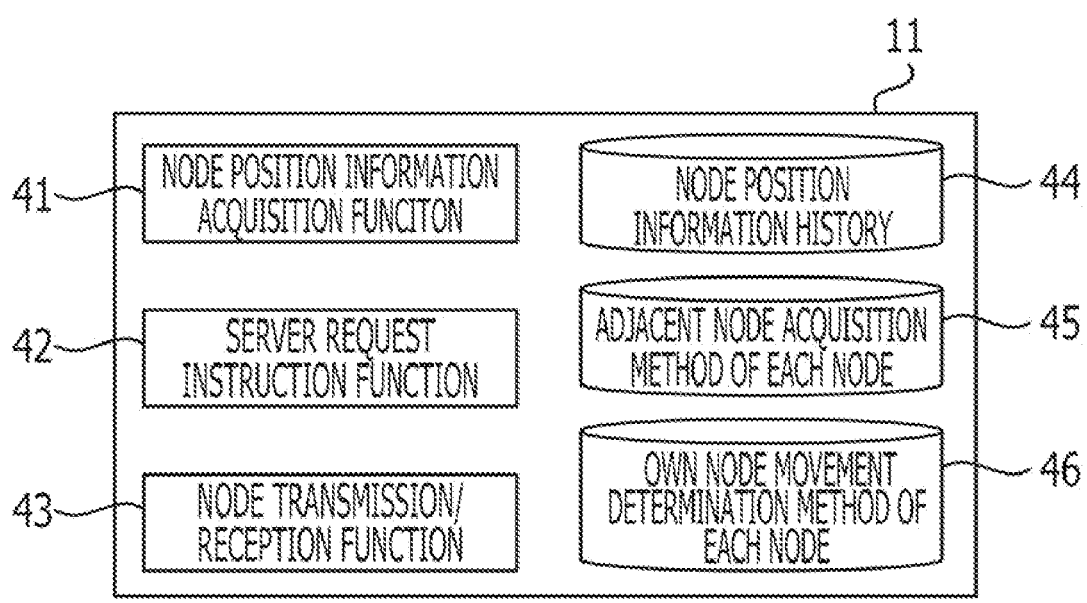
FIG. 4 is a block diagram of an example of a position information DB server according to the embodiment.

FIG. 4 is a block configuration of an example of a position information DB server according to the embodiment. The position information DB server 11 in FIG. 4 includes a node position information acquisition function unit 41, a server request instruction function unit 42, a node transmission/reception function unit 43, a node position information history DB44, an adjacent node acquisition method of each node DB45, and an own node movement determination method of each node DB46.

The node position information acquisition function unit 41 acquires position information from the position information acquisition device 13 (hereinafter called a node). The server request instruction function unit 42 instructs an adjacent node acquisition method or an own node movement determination method to a node as a server request. The node transmission/reception function unit 43 performs communication with a node.

The node position information history DB44 stores history of position information acquired from a node. The adjacent node acquisition method of each node DB45 stores an adjacent node acquisition method that is instructed to a node as a server request. The own node movement determination method of each node DB46 stores an own node movement determination method instructed to a node as a server request.

Figure 5:
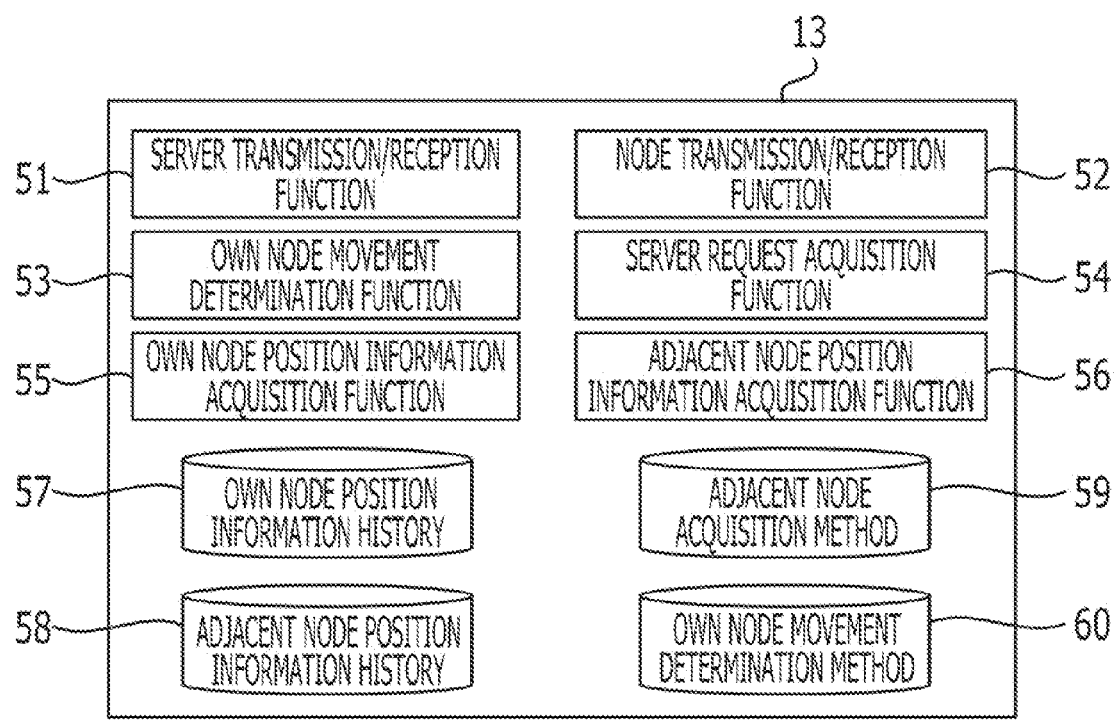
FIG. 5 is a block diagram of an example of a position information acquisition device according to the embodiment.

FIG. 5 is a block diagram of an example of a position information acquisition device according to the embodiment. The position information acquisition device 13 in FIG. 5 includes a server transmission/reception function unit 51, a node transmission/reception function unit 52, an own node movement determination function unit 53, a server request acquisition function unit 54, an own node position information acquisition function unit 55, an adjacent node position information acquisition function unit 56, an own node position information history DB57, an adjacent node position information history DB58, an adjacent node acquisition method DB59, and an own node movement determination method DB60.

The server transmission/reception function unit 51 communicates with the position information DB server 11. The node transmission/reception function unit 52 communicates with adjacent nodes of each node (an adjacent node). The own node movement determination function unit 53 determines whether an own node is moved or not, which will be described later. The server request acquisition function unit 54 acquires an adjacent node acquisition method or an own node movement determination method instructed from the position information DB server 11 as a server request.

The own node position information acquisition function unit 55 acquires position information of the own node. The adjacent node position information acquisition function unit 56 acquires position information of an adjacent node. The own node position information history DB57 stores a history of position information of the own node. The adjacent node position information history DB58 stores a history of position information acquired from an adjacent node. The adjacent node acquisition method 59 stores an adjacent node acquisition method instructed from the position information DB server 11. The own node movement determination method DB60 stores an own node movement determination method instructed from the position information DB server 11.

Figure 6:
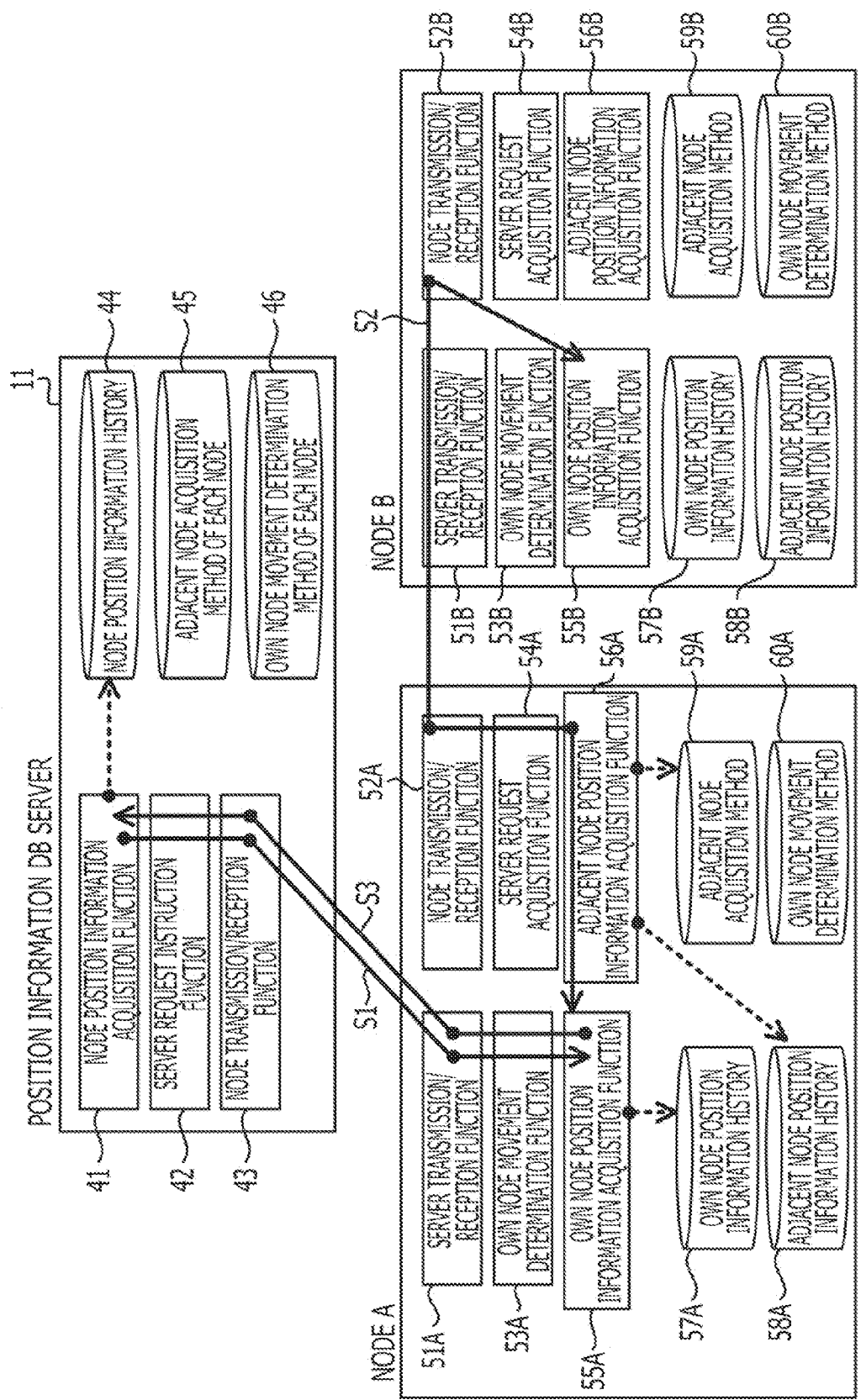
FIG. 6 illustrates processing procedures of a position information acquisition system according to the embodiment (1 of 2)
Figure 7:
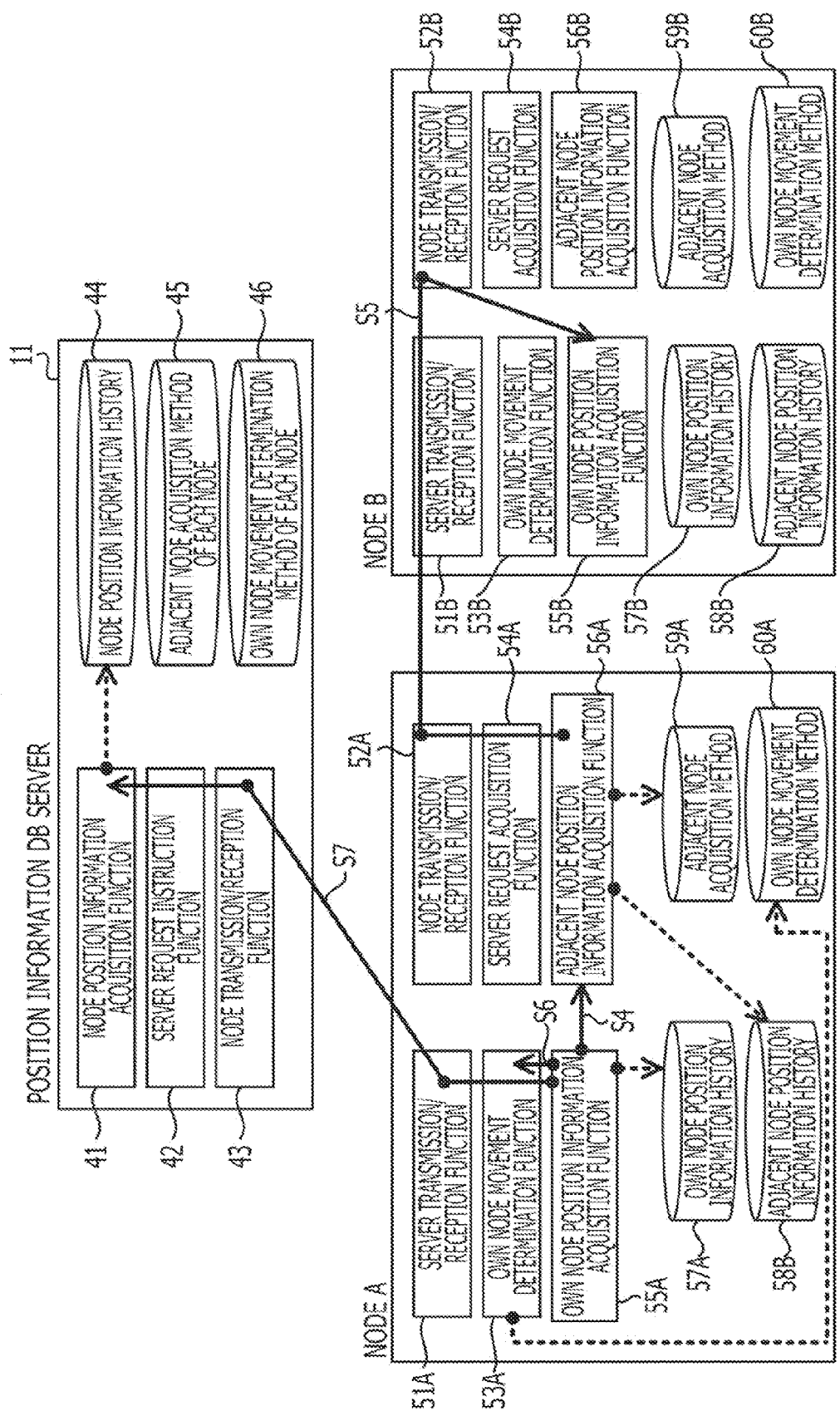
FIG. 7 illustrates processing procedures of the position information acquisition system according to the embodiment (2 of 2)

Hereinafter, processing procedures of the position information acquisition system according to the embodiment will be described. FIG. 6 and FIG. 7 illustrate processing procedures of a position information acquisition system according to the embodiment. Note that FIG. 6 and FIG. 7 illustrate a node A and a node B among a plurality of nodes included in the position information acquisition system according to the embodiment.

In operation S1 of FIG. 6, the position information DB server 11 performs a position information acquisition request to the node A. The node position information acquisition function unit 41 of the position information DB server 11 performs a position information acquisition request to the node A by using the node transmission/reception function unit 43. The own node position information acquisition function unit 55A of the node A receives the position information acquisition request from the position information DB server 11 by using a server transmission/reception function unit 51A. The own node position information acquisition function unit 55A of the node A that receives the position information acquisition request from the position information DB server 11 acquires position information of the own node (the node A itself). The own node position information acquisition function unit 55A stores the acquired own node position information in an own node position information history DB57A.

FIG. 8 illustrates a data structure of an example of an own node position information history DB. The own node position information history DB57A stores a history of the acquired own node position information. The own node position information history DB57A illustrated in FIG. 8 includes a node name, a position acquisition time, a GPS (latitude), a GPS (longitude), an IP address, a GWIP address, a wireless LAN-AP, and a transmission destination as data item.

The position information acquisition time is when the position information is acquired. The GPS (latitude) and the GPS (longitude) indicate latitude and longitude information measured by a GPS. The IP address indicates an IP address of the own node. The GWIP address indicates an IP address of a gateway device used for communication. The wireless LAN-AP indicates a wireless LAN access point used for communication. The transmission destination indicates a transmission destination of position information.

In Operation S2, the node A acquires position information from the adjacent nodes. The adjacent node position information acquisition function unit 56A of the node A checks adjacent nodes that exist near the own node. A method to check adjacent nodes is defined in the node A. For example, one example of methods to check adjacent nodes is to receive, from the position information DB server 11, a list of adjacent nodes that are likely to exist near the own node based on position information of each node stored in the node position information history DB44.

FIG. 9 illustrates a data structure of an example of the node position information history DB. The node position information history DB44 stores a history of position information acquired from a node. The node position information history DB44 illustrated in FIG. 9 includes a node name, a position acquisition time, a GPS (latitude), a GPS (longitude), an IP address, a GWIP address, a wireless LAN-AP, and a transmission destination as data item.

The position acquisition time is when a node acquires the position information. The GPS (latitude) and the GPS (longitude) are latitude and longitude information measured by the node using a GPS. The IP address indicates an IP address of the node for which the position information is acquired. The GWIP address indicates an IP address of a gateway device used for communication by the node for which the position information is acquired. The wireless LAN-AP indicates a wireless LAN access point used for communication by the node for which the position information is acquired. The transmission destination is that the node for which the position information is acquired transmits the position information.

A method to receive the list of adjacent nodes that are likely to exist near the own node from the position information DB server 11 is, for example, transmitting position information of the own node (for example, latitude and longitude information measured by a GPS) to the position information DB server 11 and searching for adjacent nodes of the node A in the node position information history DB44 by the position information DB server 11. Moreover, another example to confirm adjacent nodes is, for example, the node A autonomously searches for and detects adjacent nodes, for example, by using ad hoc communication.

Here, the description continues under the assumption that nodes B, C, D and E are confirmed as adjacent nodes of the node A. The adjacent node position information acquisition function unit 56A of the node A performs position information acquisition requests to the nodes B, C, D and E by using the node transmission/reception function unit 52A. Processing of the nodes B, C, D and E that receive the position information acquisition request is substantially the same. Thus, as one example, the processing of the node B will be described.

The adjacent node acquisition method DB59A stores what kind of position information the node A acquires from the adjacent nodes B, C, D, and E as an adjacent node acquisition method. The adjacent node acquisition method stored in the adjacent node acquisition method DB59A of the node A is instructed by the position information DB server 11 based on the adjacent node acquisition method of the node A stored in the adjacent node acquisition method of each node DB45.

FIG. 10 illustrates a data structure of an example of adjacent node acquisition method of each node DB. The adjacent node acquisition method of each node DB45 stores the adjacent node acquisition method that is instructed to a node as a server request.

The adjacent node acquisition method of each node DB45 in FIG. 10 includes, as data item, a node name, an update date and time, and items to be acquired as position information. For example, in FIG. 10, an item that the node A acquires from adjacent node as position information is an IP address, and items that the node B acquires from adjacent nodes are an IP address and a GWIP address.

An own node position information acquisition function unit 55B of the node B receives a position information acquisition request from the node A by using the node transmission/reception function unit 52B. The own node position information acquisition function unit 55B that receives the position information acquisition request from the node A acquires position information of the own node (the node B itself). The own node position information acquisition function unit 55B stores the acquired own node position information in an own node position information history DB57B. The own node position information acquisition function unit 55B of the node B transmits position information of the own node to the node A by using the node transmission/reception function unit 52B.

The adjacent node position information acquisition function unit 56A of the node A receives position information of the node B from the node B by using the node transmission/reception function unit 52A. The adjacent node position information acquisition function unit 56A stores the received position information of the node B in an adjacent node position information history DB58A.

FIG. 11 illustrates a data structure of an example of an adjacent nodes position information history DB. The adjacent node position information history DB58A stores a history of the acquired adjacent node position information. The adjacent node position information history DB58A includes a node name, a position acquisition time, a GPS (latitude), a GPS (longitude), an IP address, a GWIP address, and a wireless LAN-AP as data item.

The position information acquisition time indicates when the adjacent node acquires the position information. The GPS (latitude) and the GPS (longitude) indicate latitude and longitude information measured by the adjacent node by using a GPS. The IP address indicates an IP address of an adjacent node for which position information is acquired. The GWIP address indicates an IP address of a gateway device used for communication by the adjacent node for which position information is acquired. Moreover, the wireless LAN-AP indicates a wireless LAN access point used for communication by the adjacent node for which position information is acquired.

When the adjacent node position information acquisition function unit 56A acquires position information from the nodes B, C, D and E, the adjacent node position information acquisition function unit 56A notifies the own node position information acquisition function unit 55A of the acquisition. The adjacent node position information acquisition function unit 56A may transmit position information of the own node (the node A itself) when the adjacent node position information acquisition function unit 56A performs a position information acquisition request to the adjacent nodes.

In Operation S3, the node A transmits the own node position information to the position information DB server 11. Note that the node A may transmit position information of the adjacent node together with the position information of the own node to the position information DB server 11. The own node position information acquisition function unit 55A of the node A may transmit position information of the own node to the position information DB server 11 by using the server transmission/reception function unit 51A.

The node position information acquisition function unit 41 of the position information DB server 11 receives position information from the node A by using the node transmission/reception function unit 43. The node position information acquisition function unit 41 stores position information received from the node A in the node position information history DB44 illustrated in FIG. 9.

In operation S4 of FIG. 7, the own node position information acquisition function unit 55A of the node A periodically requests position information of the nodes B, C, D, and E to the adjacent node position information acquisition function unit 56A. In operation S5, as in operation S2 of FIG. 6, the adjacent node position information acquisition function unit 56A of the node A performs position information requests to the nodes B, C, D, and E.

When there is no response from any of the adjacent nodes for which position information is periodically acquired, or when the acquired position information is different from the one stored in the adjacent node position information history DB58A, the adjacent node position information acquisition function unit 56A notifies the own node position information acquisition function unit 55A accordingly.

In operation S6, in response to the notification from the adjacent node position information acquisition function unit 56A, the own node position information acquisition function unit 55A requests an own node movement determination function unit 53A to determine whether the own node is moved or not. The own node movement determination function unit 53A determines whether the own node is moved or not, which will be described later, according to the own node movement determination method stored in an own node movement determination method DB60A.

The own node movement determination method stored in the own node movement determination method DB60A is instructed by the position information DB server 11 based on the own node movement determination method stored in the own node movement determination method of each node DB46.

FIG. 12 illustrates a data structure of an example of an own node movement determination method of each node DB. The own node movement determination method of each node DB46 stores the own node movement determination method instructed to the node as a server request. The own node movement determination method of each node DB46 in FIG. 12 includes a node name, an update date and time, items of position information to check whether the node position is changed or not, the number of no-response nodes, and the number of no-responses.

The update date and time indicates when the own node movement determination method of each node is updated. The items of position information to check whether the node position is changed is, for example, the IP address for the node A, the IP address and the GWIP address for the node B, the IP address, the GWIP address, and the wireless LAN-AP for the node C. In the items of position information to check whether the node position is changed or not, the double circle indicates AND operation, while the circle indicates OR operation. Moreover, the number of no-response nodes provides a threshold to determine whether the own node is moved or not based on the number of adjacent nodes that do not respond. The number of no-responses provides a threshold to determine whether the node is an adjacent node that does not respond.

When the own node is determined to be moved, the own node movement determination function unit 53A notifies the own node position information acquisition function unit 55A of the determination result that indicates the own node is moved. When the node A is notified of the determination result that indicates the own node is moved, the node A proceeds to operation S7, and transmits the position information of the own node to the position information DB server 11 according to substantially the same procedures as those of operation S3.

When the own node is determined not to be moved, the own node movement determination function unit 53A notifies the own node position information acquisition function unit 55A of the determination result that indicates the own node is not moved. When the own node position information acquisition function unit 55A is notified of the determination result that indicates the own node is not moved, the processing ends without proceeding to operation S7.

Hereinafter, how the own node movement determination function unit 53A of the node A determines a movement of the own node will be described. The first method that the own node movement determination function unit 53A determines whether the own node is moved or not is based on the number of adjacent nodes that do not respond to position information acquisition requests.

FIG. 13 is a flowchart illustrating the first method in which the own node movement determination function unit determines a movement of the own node. Descriptions of a part of the flowchart in FIG. 13 will be simplified because the part of the flowchart overlaps with those illustrated in FIG. 6 and FIG. 7.

In operations S11 to S14, the node A periodically performs position information acquisition requests to the adjacent nodes and receives position information from the adjacent nodes. In operation S15, the node A stores position information received from the adjacent nodes in the adjacent node position information history DB58A. In operation S16, the node A determines whether the number of adjacent nodes that do not respond to the position information acquisition requests is 3 or more. The number "3," for example, used in operation S16 is acquired from data item of the own node movement determination method DB60A, "the number of no-response nodes." The number "3" used in operation S16 may be determined according to the number of the adjacent nodes the position information (for example, a half of the number of adjacent nodes) of which is stored in the adjacent node position information history DB58A.

The node A returns to operation S11 and continue the processing if the number of the adjacent nodes that do not respond to the position information acquisition requests is not 3 or more. Meanwhile, the node A reacquires the position information if the number of the adjacent nodes that do not respond to the position information acquisition requests is 3 or more. Processing proceeds to operation S18 and the server A notifies the position information DB server 11 about the position information of the own node.

Figure 14A:
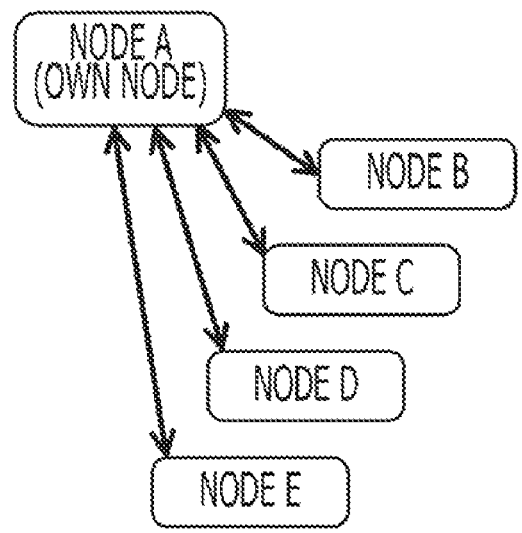
FIGS. 14A, 14B, and 14C illustrate one example of the first method in which the own node movement determination function unit determines a movement of the own node.
Figure 14B:
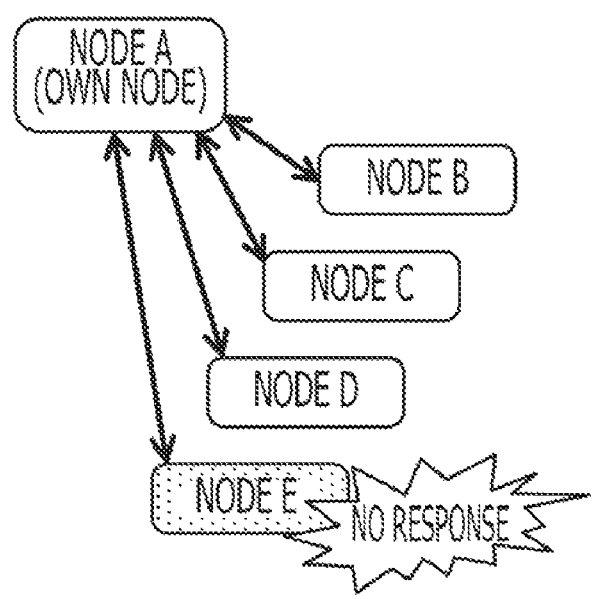
Figure 14C:
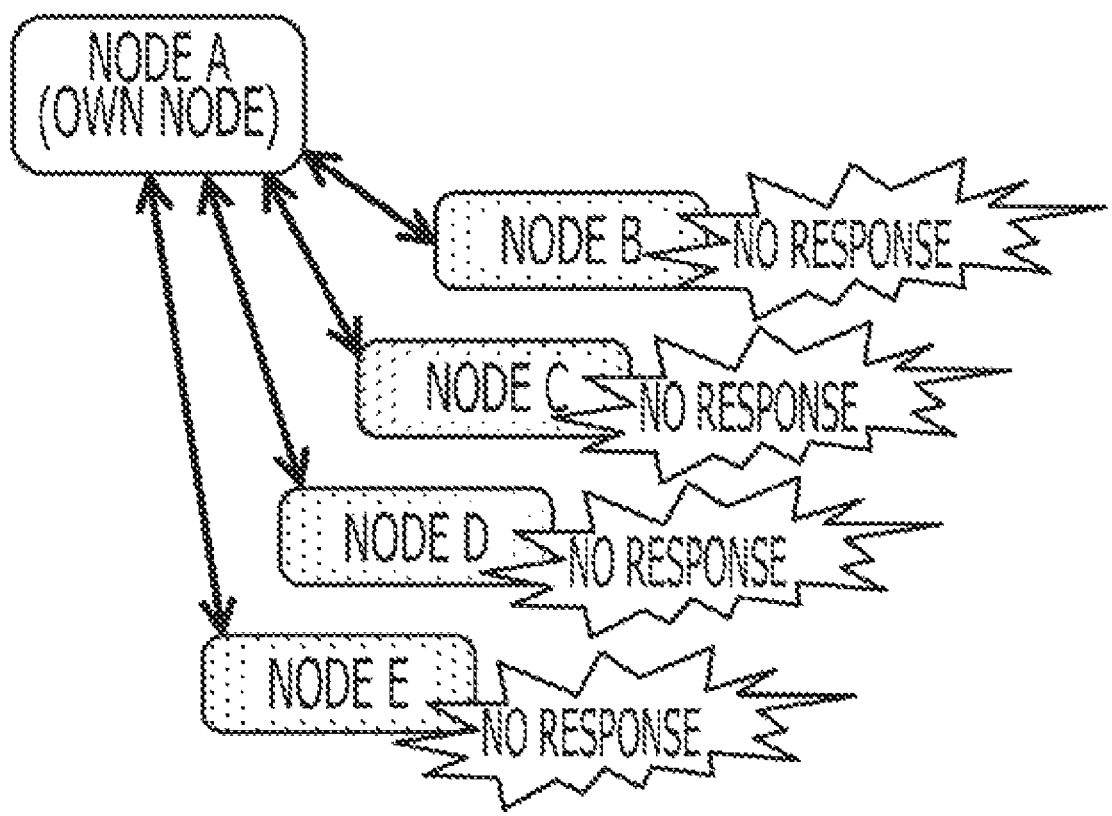

FIGS. 14A, 14B, and 14C illustrate one example of a first method in which the own node movement determination function unit determines a movement of the own node. Here, an example will be described in which the data item of the number of non-response nodes in the own node movement determination method DB60A is "3."

FIG. 14A illustrates that the node A periodically acquires position information from the nodes B to E at normal operation. FIG. 14B illustrates that the node E does not respond to the position information acquisition request. The node A determines that the own node is not moved because the number of the adjacent nodes that does not respond to the position information acquisition requests is not 3 or more.

In other words, the node A determines that the own node is not moved because the nodes B to D respond in substantially the same manner as before to the position information acquisition requests. Stated differently, the node A determines the node E is moved.

FIG. 14C illustrates that the nodes B to E do not respond to the position information acquisition requests. The node A determines that the own node is moved because the number of the adjacent nodes that do not respond to the position information acquisition requests is 3 or more.

In other words, the node A determines that the own node is moved because the nodes B to E do not respond in substantially the same manner as before to the position information acquisition requests. Stated differently, the node A determines that the own node is moved.

When the nodes D and E do not respond to the position information acquisition requests, the node A determines that the own node is not moved because the number of the adjacent nodes that do not respond to the position information acquisition requests is not 3 or more. In other words, the node A determines that the own node is not moved because the nodes B to C respond in substantially the same manner as before to the position information acquisition requests. Stated differently, the node A determines that both the nodes D and E are moved.

When the nodes C to E do not respond to the position information acquisition requests, the node A determines that the own node is moved because the number of the adjacent nodes that do not respond to the position information acquisition requests is 3 or more. In other words, the node A determines that the own node is moved because the nodes C to E do not respond to the position information acquisition requests although the node B responds in substantially the same manner as before to the position information acquisition request. Stated differently, the node A determines that both the own node and the node B are moved.

A second method in which the own node movement determination function unit 53A determines whether the own node is moved or not is based on the number of the adjacent nodes the position information (for example, an IP address, a GWIP address, and a wireless LAN-AP) of which is changed. A flowchart of the second method in which the own node movement determination function unit 53A determines a movement of the own node is substantially the same as the flowchart in FIG. 13 other than the operation S16.

In the second method to determine a movement of the own node, whether the number of the adjacent nodes the position information of which is changed is, for example, 3 or more is determined in the operation S16. The number, 3 used in the operation S16 is acquired, for example, from the own node movement determination method DB60A.

If the number of the adjacent nodes the position information of which is changed is not 3 or more, the node A returns to the operation S11 and continues the processing. Meanwhile, the node A reacquires the position information if the number of the adjacent nodes the position information of which is changed is 3 or more. Processing proceeds to operation S18 and the server A notifies the position information DB server 11 about position information of the own node.

Figure 15A:
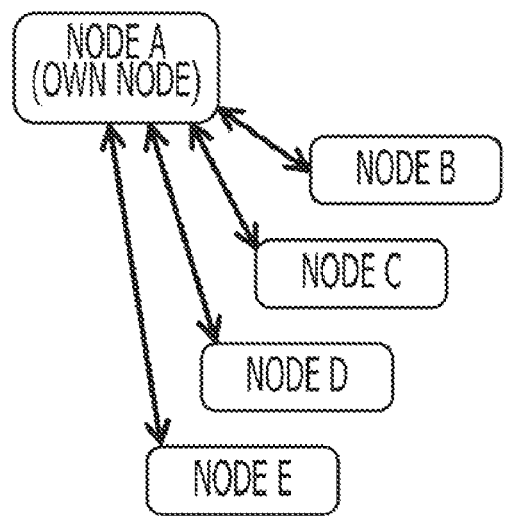
FIGS. 15A, 15B, and 15C illustrate one example of a second method in which the own node movement determination function unit determines a movement of the own node.
Figure 15B:
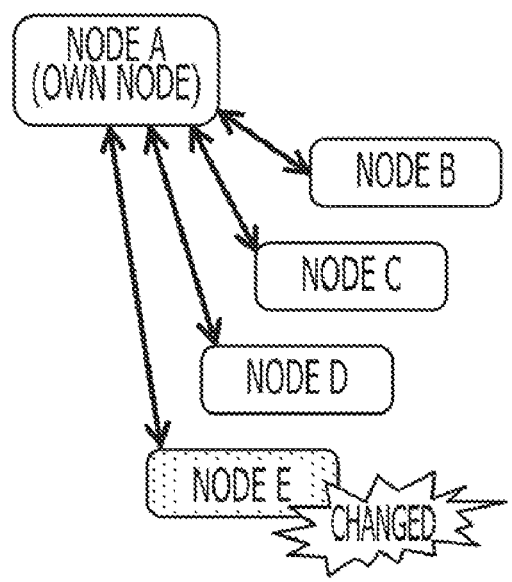
Figure 15C:
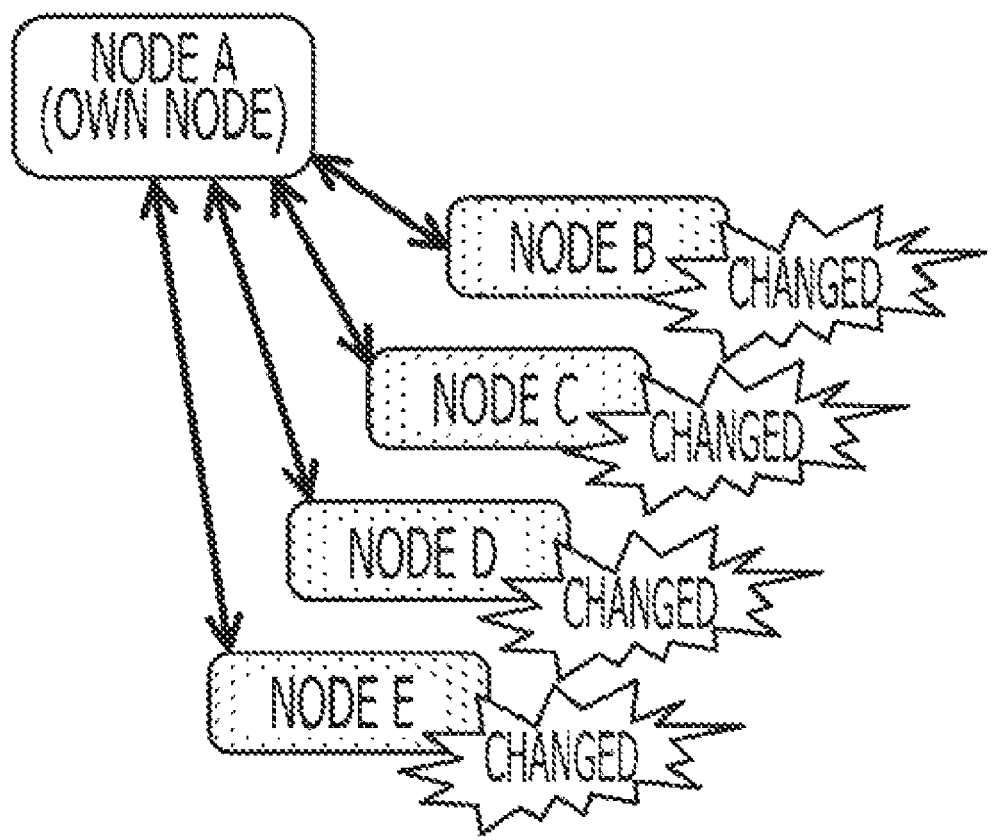

FIGS. 15A, 15B, and 15C illustrate one example of a second method in which the own node movement determination function unit determines a movement of the own node. FIG. 15A illustrates that the node A periodically acquires position information from the nodes B to E at normal operation. FIG. 15B illustrates that the position information acquired from the node E is changed. The node A determines that the own node is not moved because the number of the adjacent nodes the position information of which are changed is not 3 or more. In other words, the node A determines that the own node is not moved because the position information acquired from the nodes B to D is not changed. Stated differently, the node A determines that the node E is moved.

FIG. 15C illustrates that the position information acquired from the nodes B to E is changed. The node A determines that the own node is moved because the number of the adjacent nodes the position information of which are changed is 3 or more. In other words, the node A determines that the own node is moved because the position information acquired from the nodes B to D is changed. Stated differently, the node A determines that the own node is moved.

According to the embodiment, the node A reacquires the position information of the own node when the own node is determined to be moved, and notifies the position information DB server 11 of the position information. Therefore, the node A may reduce frequency to acquire position information of the own node and to notify the position information DB server 11 of the position information, and thereby power consumption and communication cost may be suppressed.

Moreover, according to the embodiment, position information of the own node is reacquired and notified to the position information DB server 11 when the own node is determined to be moved. Accordingly, the position information DB server 11 may acquire accurate position information. Furthermore, according to the embodiment, the cost may further be reduced by making a node with lower cost in transmitting position information to the position information DB server 11 as a representative node and transmitting position information of each node from the representative node.

All examples and conditional language recited herein are intended for pedagogical purposes to aid the reader in understanding the invention and the concepts contributed by the inventor to furthering the art, and are to be construed as being without limitation to such specifically recited examples and conditions. Although the embodiments of the present invention have been described in detail, it should be understood that the various changes, substitutions, and alterations could be made hereto without departing from the spirit and scope of the invention.

What is claimed is:

1. A position information acquisition device comprising:
a first communication unit to communicate with at least another position information acquisition device;
a detection unit to detect whether a number of other position information acquisition devices that are not communicable with the first communication unit reaches a threshold or higher based on history information that records position information of the other position information acquisition devices that were previously communicable with the first communication unit and information of the other position information acquisition devices that are currently communicable with the first communication unit;
the position information acquisition device determining that the position information acquisition device is moved when the threshold is reached and determining that the position information acquisition device is not moved when the threshold is not reached;
a position measuring unit to measure a position of the position information acquisition device when the detection unit performs a detection; and
a second communication unit to transmit position information measured by the position information measuring unit to a server that manages position information of the position information acquisition device and the other position information acquisition devices.

2. The position information acquisition device according to claim 1,
wherein the detection unit detects whether the number of the other position information acquisition devices the position information of which is changed reaches another threshold or higher based on history information that records position information of the other position information acquisition devices and position information of the other position information acquisition devices that is newly acquired from the other position information acquisition devices by the first communication unit.

3. The position information acquisition device according to claim 1,
wherein the second communication unit transmits together position information of the other position information acquisition devices that is acquired from the other position information acquisition devices when the second communication unit transmits position information measured by the position measuring unit to the server.

4. The device according to claim 1,
wherein the threshold is determined by one of the number of the other position information acquisition devices communicable with the first communication unit that is recorded in the history information, and the total number of the other position information acquisition devices the position information of which is recorded in the history information.

5. The device according to claim 1,
wherein the threshold is instructed by the server by using the second communication unit.

6. The device according to claim 1,
wherein the position information includes at least one of,
latitude and longitude information measured by a global positioning system (GPS),
one of a mobile phone station used for communication,
an access point of a wireless local area network (LAN) used for communication, an Internet Protocol (IP) address of a gateway device used for communication, and
an IP address of the position information acquisition device.

7. A computer-readable non transitory storage medium storing a position information acquisition program that causes a computer to perform processing of a first position information acquisition device in a position information acquisition system that includes a plurality of the position information acquisition devices and a server to manage position information of the plurality of the position information acquisition devices, the position information acquisition program causing the computer to execute a process comprising:
communicating with at least one other position information acquisition devices in the plurality;
detecting whether the number of other position information acquisition devices in the plurality that are not communicable with the first position information acquisition device reaches a threshold or higher based on history information that records position information of the other position information acquisition devices that are were previously communicable with the first position information acquisition device and information of the other position information acquisition devices that are currently communicable by the communicating;
determining that the first position information acquisition device is moved when the threshold is reached and determining that the first position information acquisition device is not moved when the threshold is not reached;
measuring a position of the first position information acquisition device when detection is performed by the detecting; and
transmitting measured position information measured by the measuring to the server.

8. The computer-readable non transitory storage medium according to claim 7,
wherein the detecting detects whether the number of other position information acquisition devices the position information of which is changed reaches another threshold or higher based on history information that records position information of the other position information acquisition devices and position information of the other position information acquisition devices that is newly acquired from the position information acquisition devices other than the own device by the communicating.

9. The computer-readable non transitory storage medium according to claim 7,
wherein the transmitting transmits together position information of the other position information acquisition devices that is acquired from the other position acquisition devices when the transmitting transmits position information measured by the measuring to the server.

10. The computer-readable non transitory storage medium according to claim 7, the program causing the computer to execute the process further comprising:
determining the threshold based on one of the number of the other position information acquisition devices communicable with the first position information acquisition devices that is recorded in the history information, and the total number of the position information acquisition devices other than the own device the position information of which is stored in the history information.

11. A position information acquisition system that includes a plurality of position information acquisition devices and a server to manage position information of the plurality of the position information acquisition devices, the system comprising:
a first position information acquisition device in the plurality that includes,
a first communication unit to communicate with at least another position information acquisition device in the plurality;
a detection unit to detect whether the number of the other position information acquisition devices in the plurality that are communicable with the first communication unit reaches a threshold or higher based on history information that records position information of the other position information acquisition devices that were previously communicable with the first communication unit and information of the other position information acquisition devices that are currently communicable with the first communication unit;
the first position information acquisition device determining that the first position information acquisition device is moved when the threshold is reached and determining that the first position information acquisition device is not moved when the threshold is not reached;
a position measuring unit to measure a position of the first position information acquisition device when the detection unit performs a detection; and
a second communication unit to transmit position information measured by the position information measuring unit to the server.

12. The system according to claim 11,
wherein the detection unit detects whether the number of the other position information acquisition devices the position information of which is changed reaches another threshold or higher based on history information that records position information of the other position information acquisition devices and position information of the other position information acquisition devices that is newly acquired from the other position information acquisition devices by the first communication unit.

13. The system according to claim 11,
wherein the second communication unit transmits together position information of the other position information acquisition devices that is acquired from the other position information acquisition devices when the second communication unit transmits position information measured by the position measuring unit to the server.

14. The system according to claim 11,
wherein the threshold is determined by one of the number of the other position information acquisition devices communicable with the first communication unit that is recorded in the history information, and the total number of the other position information acquisition devices the position information of which is recorded in the history information.

15. The system according to claim 11,
wherein the threshold is instructed by the server by using the second communication unit.

16. The system according to claim 11,
wherein the position information includes at least one of,
latitude and longitude information measured by a global positioning system (GPS),
one of a mobile phone station used for communication,
an access point of a wireless local area network (LAN) used for communication, an Internet Protocol (IP) address of a gateway device used for communication, and
an IP address of the position information acquisition device.

* * * * *